United States Patent [19]

Adsett

[11] Patent Number: 4,538,186
[45] Date of Patent: Aug. 27, 1985

[54] METHOD AND APPARATUS FOR DISTRIBUTING LEADING SPACE

[75] Inventor: David E. Adsett, Charlton Kings, England

[73] Assignee: Allied Corporation, Morris Township, Morris County, N.J.

[21] Appl. No.: 370,777

[22] Filed: Apr. 22, 1982

[30] Foreign Application Priority Data

May 28, 1981 [GB] United Kingdom ................. 8116389

[51] Int. Cl.³ ............................................ H04M 1/24
[52] U.S. Cl. ................................................. 358/298
[58] Field of Search ........................ 358/286, 298, 199

[56] References Cited

U.S. PATENT DOCUMENTS 4,080,634 3/1978 Schreiber ............................ 358/298
4,122,496 10/1978 Childress et al. ................... 358/298

FOREIGN PATENT DOCUMENTS 2056217A 3/1981 United Kingdom .

Primary Examiner—Michael A. Masinick
Assistant Examiner—Edward L. Coles
Attorney, Agent, or Firm—Joel I. Rosenblatt; Anthony F. Cuoco; William F. Thornton

[57] ABSTRACT

A method and apparatus is shown for leading an imaging surface relative to an imaging beam under two controls where first and second leading spaces are produced. The second leading space being a different width than the first leading space, is distributed among the first leading space separating a plurality of line pairs. The second leading space is interspersed within first leading spaces and is visually less perceptible to the human eye. A pattern describing a matrix of row and column positions control the spacial movement of an imaging beam and after each leading step the imaging beam reproduces the original graphic within each of the elemental image positions or image areas of the matrix.

12 Claims, 5 Drawing Figures

COLUMN

|   | a | b | c | d | e | f | g | h |
|---|---|---|---|---|---|---|---|---|
| 0 | 2 | 4 | 1 | 5 | 7 | 0 | 3 | 6 |
| 1 | 3 | 5 | 2 | 6 | 8 | 1 | 4 | 7 |
| 2 | 4 | 6 | 3 | 7 | 9 | 2 | 5 | 8 |
| 3 | 5 | 7 | 4 | 8 | 10 | 3 | 6 | 9 |
| 4 | 6 | 8 | 5 | 9 | 11 | 4 | 7 | 10 |
| 5 | 7 | 9 | 6 | 10 | 12 | 5 | 8 | 11 |
| 6 | 8 | 10 | 7 | 11 | 13 | 6 | 9 | 12 |
| 7 | 9 | 11 | 8 | 12 | 14 | 7 | 10 | 13 |
| V.O. | 2 | 4 | 1 | 5 | 7 | 0 | 3 | 6 |

ROW

METHOD AND APPARATUS FOR DISTRIBUTING LEADING SPACE

FIELD OF THE INVENTION

This invention relates to the use of an imaging beam moved in a raster to form a line of images and then from line to line to form a succession of lines, defining a total graphic image. In particular, this invention relates to the leading space formed between lines and the distribution of that space between a plurality of line pairs to reduce the visual effect of any difference in the leading spaces.

BACKGROUND

There are many examples of devices for scanning an original to produce video signals. Many of these devices produce line graphics or halftones by imaging separate patterns. Such an example is shown in U.S. Pat. No. 3,806,641 of Crooks where character words are stored for reproduction of image areas within the original.

In the prior art devices, a series of line graphic or halftone dot patterns may be reproduced as separate image areas. A succession of separate image areas may form one or more lines of images. In most cases, successive lines are formed in a raster by reproducing a succession of image areas in a line and deflecting or leading the imaging means relative to the imaging surface in the direction of the succession of lines. Where the beam is deflected a maximum in the direction of successive raster lines and the maximum beam deflection is less than the length or width of the graphic image, then it is necessary to increment the imaging surface, to bring a fresh portion of the imaging surface under the beam. When this is done, the beam is deflected in the opposite direction to its starting position and swept across the imaging surface in a raster to form a new succession of lines.

A beam can be leaded with a much greater precision than the imaging surface can be leaded by a mechanical movement. A leading space between image lines, formed by movement of the beam will usually be consistent with all other leading spaces produced by movement of the beam. However the leading space resultant from mechanically moving the imaging surface cannot be reproduced with the same precision as the leading space resultant from deflection of the beam. The mechanical movement for moving an imaging surface cannot be started and engaged, and then stopped with the precision of the beam deflection means nor can leading space resultant from the mechanical movement be reproduced with sufficient precision when leading the imaging surface a second time. As a consequence, the leading spaces between lines formed by movement of the imaging surface can be of varying widths compared to each other and of a different width compared to the leading space produced by movement of the imaging beam.

The difference in width is known as leading space error. It is possible for the human eye to detect very small differences in leading space error resultant from leading of the imaging beam from line to line and leading of the imaging surface. It is very difficult and expensive to reduce this error below the very small differences that can be detected by the human eye. Additionally, a highly precision movement for the imaging surface is normally not found in typesetters designed only for text output where interline spacing does not have such a detrimental effect upon the appearance of the text as it does in the reproduction of halftone dots.

SUMMARY OF THE INVENTION

The principles of this invention are explained with reference to a reproduction means which produces a succession of separate image areas to form a line and then produces a second succession of separate image areas to form a second line. An imaging means such as an imaging beam is moved or leaded from one line to a second line and the process of imaging the separate image areas continues. The information reproduced in the imaging areas may be line graphic patterns or halftone dot patterns, each separate pattern reproducing an element of an original graphic in an image area. Between the formation of a plurality of image areas on one line and the formation of a plurality of image areas on the second line, the imaging means is moved relative to the imaging surface in a step to form a leading space between first and second lines forming a line pair. This process is repeated as is known, to form a succession of lines and to form a graphic of line graphic or halftone images separately defined in each image area.

Within an array of halftone dots the human eye can detect errors as small as one percent of the interline dot spacing. Where the interline dot spacing is 100 lines per inch, the permissible error between adjacent line of dots is 0.2 mills.

The imaging surface may be moved relative to the imaging beam by displacing the imaging means such as an imaging beam. In this case, the consecutively reproduced lines, will usually define a successive number of interline spaces or leading spaces whose width differences are small enough to be undetected by the human eye.

Where the imaging means is moved relative to the surface mechanically, as by moving the surface, then the mechanical movement being of a lower precision than the beam movement will be unable to produce an interline leading space of the same consistent width so the differences in the width between the leading spaces or leading space error will be detected by the human eye. The leading space error usually appears as a noticeably different leading space compared to the other leading spaces. Where a series of leading spaces are produced by the movement of the imaging beam, and then a leading space is produced by movement of the imaging surface, a line of noticeably different width between blocks of evenly spaced lines will appear.

The difficulty in achieving a consistent width leading space when moving the imaging surface by mechanical means and the visual effect produced by leading space error caused by leading spaces of varying width is reduced according to the principles of this invention. This invention achieves uniformly appearing leading spaces between lines of separate image areas. The image areas as stated are elements of a total graphic. After a succession of image areas are reproduced, a leading means moves the imaging surface relative to the imaging means in separate steps, to a successive line and the reproduction of the next set of separate image areas on the next successive line is started. According to the principles of the invention, a an imaging means produces a succession of half tone images, to form lines of a graphic image on a two dimensional surface. Movement of the imaging means relative to the imaging surface produces a leading space between lines. The leading space formed between images is distributed over a plurality of lines formed by the image areas. According to the principles of the invention, signals are derived which are indicative of the information content of element image areas of a graphic. As stated above these image areas may be line graphic or halftone dot patterns. The image areas responsive to the signals are reproduced on the imaging surface at predetermined locations. Successively produced image areas then form lines. Within the reproduction process, the reproduced image areas are leaded in separate leading steps in the direction of the succession of lines and the separate leading spaces, produced as by for example movement of the imaging surface, are distributed between a plurality of line pairs. Where for example the leading space is produced by either deflection of the imaging beam, or movement of the imaging surface, then first and second leading spaces will be reproduced. Where the second leading space, such as that produced by movement of the imaging surface represents a leading space error, it may be distributed among the leading spaces separating a plurality of line pairs and interspersed in the first leading spaces. Subsequent to movement of the imaging surface, a series of images are formed by deflecting or leading the imaging beam. By leading the imaging beam to form separate images on different lines, the leading space produced by movement of the imaging surface is distributed over several lines, and interspersed within the leading space produced by movement of the imaging means.

As described in the preferred embodiment, a pattern is stored having the form of a matrix defined in rows corresponding to the lines of the images areas and columns corresponding to the succession of lines. The stored matrix defines vertical offset values for each column, and with each row and column position in the matrix being defined by a scan sequence number. For the purpose of explanation, a scan sequence is completed by movement of the imaging beam across the imaging surface corresponding to a predetermined columnar width, the number of columns being random for each scan sequence. As known in the art, the pattern is electronically juxtaposed with a designated area on the imaging surface and controls the sequential imaging of each image area and the spacial sequencing of each reproduced image area. As the pattern is juxtaposed on an area of the imaging surface, each row and column position in the matrix then corresponds to an image area on the imaging surface. As stated, each image area within the matrix, has a scan sequence number. The image areas are reproduced during the scan sequence given by the scan sequence numbers for the respective image areas. The row location of the image areas is determined by the scan sequence number for the respective image area, and the vertical offset for the columnar location for the respective image area.

The image areas are reproduced in a spacial sequence given by the pattern. In particular each scan sequence, defining movement of the imaging means in the direction of a dimension of the pattern and across a predetermined number of columns, defines a scan sequence number. The imaging beam is then moved responsive to the pattern. In the preferred embodiment, the imaging means is moved from column to column. A means is provided for recording the beam position. As each column has a vertical offset, a means compares the scan sequence number with the vertical offset to determine row number for the imaging beam in that column position. The imaging beam is then moved responsively to the designated row number and the image area is then reproduced in that column and that row number. The imaging beam is then moved or displaced to another column. As shown in the preferred embodiment, although not necessary to the practice of the invention, the imaging beam is moved from one column to the next successive adjacent column always moving in the direction of a line until the full columnar width of the particular juxtaposed scan sequence is completed, and a new scan sequence is initiated. In movement of the imaging means from column to column, the number for each separate scan sequence is combined with the columnar vertical offset for the next columnar location of the beam. The beam is then moved to the next image area corresponding to the juxtaposed matrix position.

In the formation of a graphic comprising lines of images, and according to the invention, a staggered or discontinuous edge is produced. Accordingly, a means is provided for finishing the graphic and providing a straight edge by storing a row number corresponding to the bottom line of image areas. Then, any row number produced by the combination of the columnar vertical offset and the scan sequence number as explained above, can then be compared to the final row number and where the final row number and the produced row number are different, the imaging means can be inhibited, for example, where the produced row number is greater than the imaging means indicating an image spacially arranged below the bottom edge of the graphic or outside the graphic. The same effect can be accomplished where the formation of the graphic is stopped in the middle of its formation. Then responsive to a stop signal, a row number is stored corresponding to the final row of the graphic and all imaging of image areas outside that line is inhibited.

Accordingly then, leading spaces of different widths are produced when leading the imaging beam and leading the imaging surface. This invention reduces the impact of that difference in spacing by mixing the leading spacing produced by the movement of the imaging means amongst several lines formed during leading of the imaging means. For example where the image surface is leaded in a separate leading step after 8 lines of beam leading, the image surface movement leading space may be distributed between any or all of the 8 lines produced by beam leading. The observer, then must look for the leading space produced by the movement of the imaging surface distributed and interspersed within the 8 lines of beam leading and must look for the image surface leading space in separate rows. Such a distributed spacing will be considerably less evident than the same spacing appearing continuously across the imaging surface.

In the system shown, an original may be scanned, or by other means a graphic may be encoded into signals. The signals may correspond to separate image areas such as half tone dots. The image areas are also encoded for their corresponding locations so when reproduced the image areas, in the form of half tones such as screen dot patterns may be appropriately produced at the corresponding location on the imaging sheet. The spacial positioning of the beam is controlled by a pattern which is juxtaposed with the imaging surface and causes the imaging beam to move to the proper area of the imaging surface corresponding to a respective image.

Accordingly, an imaging beam is moved across a two dimensional surface to form a succession of lines in the direction of a first dimension and with each of the lines being in the direction of a second dimension. A stored pattern controls the spacial sequencing of the image areas on the imaging surface and the location of each successively reproduced image area relative to a preceding reproduced image. The pattern leads the beam from row to row between successively reproduced images so that the leading space produced for example by movement of the imaging surface is distributed amongst several line pairs. Where two leading spaces of different widths are produced as for example by an imaging beam and by mechanical movement of the leading surface, the second leading space produced by movement of the imaging surface is distributed among the first leading space produced by movement of the imaging beam and interspersed with said first leading space.

BRIEF DESCRIPTION OF THE DRAWINGS

FIG. 2 shows the graphic of FIG. 1 juxtaposed with a reproduction pattern, directing the displacement of an imaging means to image areas corresponding to the pattern matrix row and column positions and with the image area patterns arranged at 0 degrees.

FIG. 4 shows a different reproduction pattern, similar to the pattern of FIG. 1, but arranged with the halftone dot patterns at 45 degrees.

DESCRIPTION OF THE PREFERRED EMBODIMENT

Figure 1:
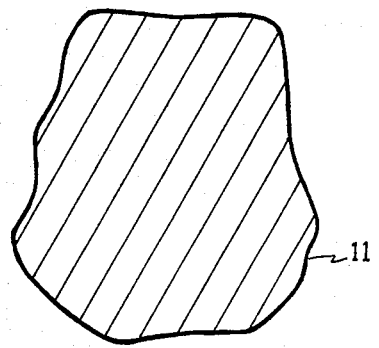
FIG. 1 shows an original graphic.

A graphic image 11 is shown in FIG. 1. This image shown as an original may be a halftone image of varying gray tones or may be of uniform density.

As is well known in the art, a scanning system or other suitable system may scan a graphic and produce electronic signals representative of the gray density for a series of elemental areas comprised by the graphic 11. An imaging means may then reproduce these elemental areas as halftone dot patterns or line graphics, which when reproduced, duplicates 11. Such systems are shown in U.S. Pat. No. 4,080,634 and U.S. Pat. No. 3,806,641. An electronic signal such as a binary word may be used to access from memory a halftone dot or line graphic pattern.

Accordingly, information in the form of electronic signals may be stored corresponding to the information content of the graphic 11.

The reproduction system must have the capability of identifying the pattern matrix row and column positions relative to the graphic 11. Suitable machinery can be used to correlate the row and column matrix position and the information in it to the graphic 11 and to properly orient the line graphic or screen dot patterns accessed from a memory for reproducing the original image in proper alignment.

However, the elemental image areas of the graphic 11 reproduced in the matrix row and column positions need not be produced in any one spacial sequence. Halftone dot patterns or line graphic patterns may be selected for each respective row and column matrix position in the graphic 11 and these patterns may be randomly reproduced in a random spacial sequence.

Figure 4:
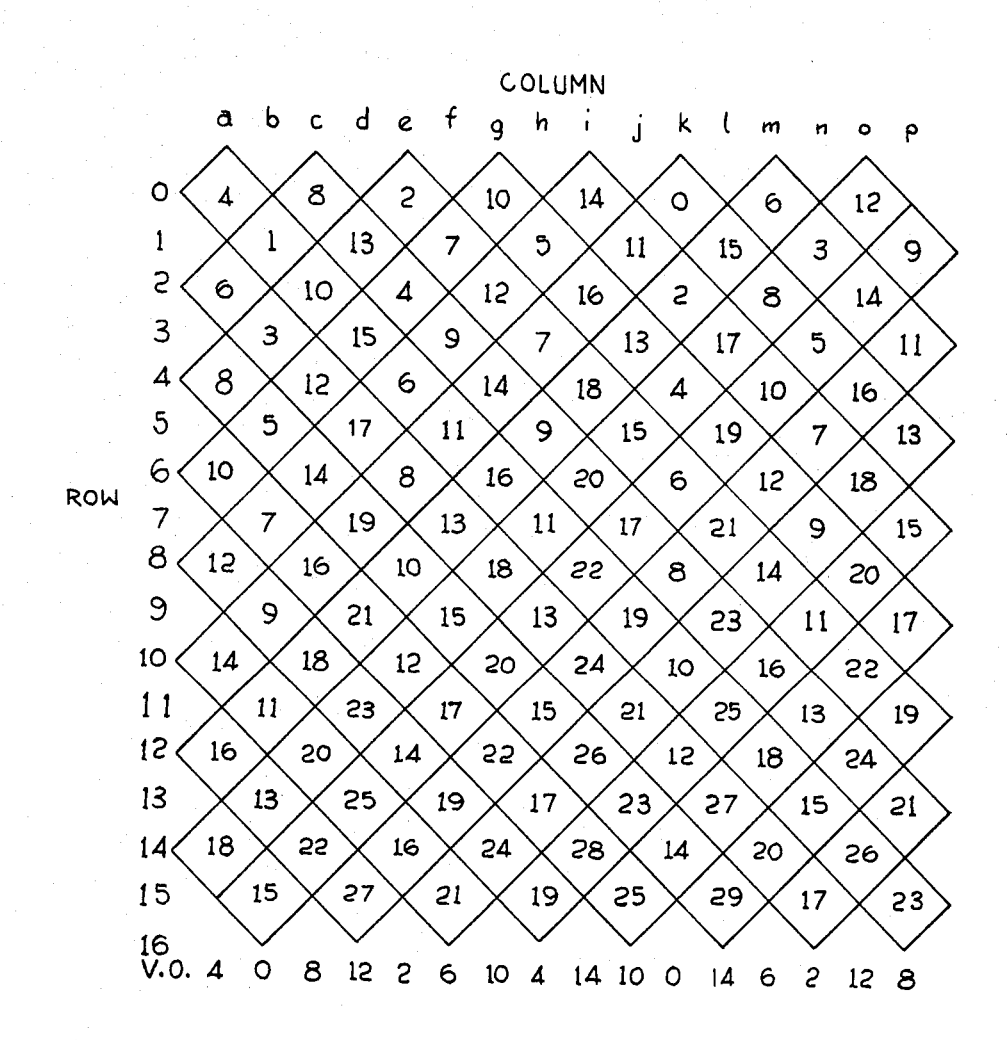

As shown in FIG. 2, the reproduced graphic 11 is shown on an imaging surface juxtaposed with the matrix reproduction pattern having row and column positions 0a through 7h. The pattern is used for controlling movement of an imaging means and reproduction of the matrix row and column image areas. The image areas such as 0a, 0b, 0c, through 7e, 7f, 7g, 7h, are all shown at a 0 degree alignment with each other. However, it should be understood that the image areas reproduced corresponding to the matrix position can be arranged at angles greater than 0 degrees such as 45 degrees as shown in FIG. 4. The pattern has vertical offsets corresponding to each column. As shown, each adjoining vertical offset for each adjoining column has a different value as will be explained. Each matrix row and column position is denoted by a number corresponding to a scan sequence. The scan sequence number indicates that a matrix row and column position is imaged during the scan sequence shown by the number therein. For example, the row and column matrix position imaged during scan sequence 6 by the pattern of FIG. 2 would be positions 4a, 2b, 5c, 1d, 6f, 3g, and 0h.

The pattern may be stored in the form of electronic signals as is well known in the art. The imaging beam would be oriented with regard to the imaging surface and the pattern, as is well known in the art. Also, as is well known in the art, once the imaging beam has been moved through an area on the imaging surface corresponding to the juxtaposed electronic pattern, the pattern may be electronically shifted to another area of the imaging surface and the scanning repeated.

For the purpose of explaining the preferred embodiment, a scan sequence is defined by movement of the imaging beam across predetermined columns of the scanning pattern such as from column a, column c and column f for scan sequence 2. A suitable means may be provided as is known in the art for registering each particular scan sequence of the imaging beam and for indexing the scan sequence number each time a scan sequence is completed and a new sequence is about to start.

Each scan sequence comprises a predetermined number of columns as shown by the scan sequence numbers in the matrix column positions.

As stated above, the pattern may control each sequential movement of the imaging beam to the next sequential row and column matrix position preparatory to reproducing the next image area.

The purpose of the invention is to distribute a leading space error, being of a different width than other leading spaces between separate lines of images, making the leading space error less apparent to the eye. This is accomplished according to the principals of the invention by taking a leading space of a designated width and of an established length such as that produced by movement of the imaging surface and distributing portions of its length between different rows. The result is that the leading space is discontinuous and instead of extending in an unbroken leading space line across a dimension of the imaging surface such as the second dimension or width, the leading space is distributed between a plurality of rows and in interspersed with other leading spaces.

Where movement of the imaging surface produces a second leading space of different width compared to a first leading space such as produced by movement of the imaging beam, then the second leading space being of a different width than the first leading space, is interspersed in separate first leading spaces and distributed between separate line pairs. For example the second leading space may be broken into sections of smaller lengths such as that of a pattern column width and then each section of the second leading space would be distributed in separate first leading spaces between separate line pairs and may be contiguous with the first leading space.

While the inventive principals are explained with reference to line graphic or halftone dot pattern image areas, the image area could also be a smaller picture element or pixel or any other type of picture element which when reproduced together with other picture elements will form a graphic.

As stated above, the means for storing electronic signals indicative of an image to be reproduced on an image area and imaging or reproducing those image areas according to those signals, and in a predetermined orientation on an imaged surface, as is known in the art, is shown in U.S. Pat. No. 4,080,634 of Schrieber; U.S. Pat. No. 4,051,536 of Roetling; U.S. Pat. No. 4,122,496 of Childres and U.S. Pat. No. 3,806,641 of Crooks and the details of such an apparatus do not form part of this invention, known in the art, and not described. The system as stated above should have the capability of identifying the location of the image areas relative to the original graphic. The electronic signals indicative of the images, should then be accessed from memory and reproduced in a predetermined spacial relationship to the original. Also, as known in the art, image area portions of the original corresponding to matrix positions within a reproduction pattern may be rearranged when reproducing the image areas and the reproduced image areas corresponding to the pattern matrix positions may be spacially reordered relative to their positions in the original. In addition the image areas on the imaging surface may be reproduced in a spacial sequence differing from the spacial order of the related areas on the original. For example, in FIG. 2, the reproduction of image area 2e need not necessarily follow reproduction of the image area 2d, even though the imaging beam may be directed to move across the imaging surface from column to column (from column a through h). The image areas 0a to 7h on the imaging surface, corresponding to each of the matrix positions within the matrix shown in FIG. 2 may be reproduced in any order. As shown in FIG. 2, the reproduced graphic 11 is shown juxtaposed with the pattern matrix and with each of the pattern matrix positions 0a through 7h being reproduced individually to form the graphic 11. As stated above, each image area may be reproduced from stored signals representing the part of the original within each respective pattern matrix position 0a through 7h.

In the matrix, each column a through h has a vertical offset (V.O.). The V.O. is a key to locating the imaging means in the correct position on the image surface and at each respective pattern matrix row and column position. To illustrate, the pattern matrix of FIG. 2 is shown in an 8×8 matrix, although it should be understood that the matrix may be made smaller or larger, in any direction. In explaining the invention, it is assumed that the imaging surface is moved to bring a new area of the imaging surface under the range of the imaging beam between sequential scan 7, and sequential scan 8 (zero being the first scan number). As stated above, a sequential scan is a movement of the imaging beam corresponding to a predetermined number of columns in the juxtaposed stored pattern matrix. In the case of the preferred embodiment, the scan sequence describes a movement of the imaging means across a second dimension of the imaging surface corresponding to the column locations given for each respective scan number in Table I. However as should be understood, the scan sequence can be defined in any other manner consistent with the principles of the invention so as to distribute a second leading space between different line pairs in the reproduced image and interspersed amongst the line pairs.

In the preferred embodiment, the system retrieves a screen dot pattern from memory corresponding to a pattern matrix row and column position and reproduces that half tone image in the corresponding image area on the imaging surface corresponding to the pattern matrix row and column position. In the preferred embodiment the sequence of reproducing image areas on the imaging surface sequentially reproduces image areas on separate lines or rows shown by the sequence in Table I and by the pattern in FIG. 2. The numbers in each of the positions 1a through 7h correspond to a scan number in which the respective areas are imaged. As for example, area 0a, 1c and 2f would be imaged during scan number 2. Area 0f would be imaged in scan number 0. The particular image area positions for each numbered sequential successive scan 0 through 14 in the example is given by:

scan number − vertical offset (V.O.) = row number

An example is given with reference to FIG. 2 for the image to be located in column c in scan number 6. Scan number (6) − vertical offset (V.O.) (1) = row number 5.

During the scan number 6 the imaging means is displaced to position 5c and the image area reproduced in column c row 5 will be that portion of the graphic 11 juxtaposed with pattern matrix position 5c and represented by a halftone or a line graphic, as shown.

Referring to Table I a spacial sequence for reproducing each of the image areas according to the example of FIG. 2 is shown.

TABLE I

| Scan Number | Reproduction Line & Column No. Location | | | | | | | |
|---|---|---|---|---|---|---|---|---|
| 0 | 0f | | | | | | | |
| 1 | 0c | 1f | | | | | | |
| 2 | 0a | 1c | 2f | | | | | |
| 3 | 1a | 2c | 3f | 0g | | | | |
| 4 | 2a | 0b | 3c | 4f | 1g | | | |
| 5 | 3a | 1b | 4c | 0d | 5f | 2g | | |
| 6 | 4a | 2b | 5c | 1d | 6f | 3g | 0h | |
| 7 | 5a | 3b | 6c | 2d | 0e | 7f | 4g | 1h |
| 8 | 6a | 4b | 7c | 3d | 1e | | 5g | 2h |
| 9 | 7a | 5b | 4d | 2e | | 6g | 3h | |
| 10 | 6b | 5d | 3e | 7g | 4h | | | |
| 11 | 7b | 6d | 4e | 5h | | | | |
| 12 | 7d | 5e | 6h | | | | | |
| 13 | 6e | 7h | | | | | | |
| 14 | 7e | | | | | | | |

In the implementation of the reproduction pattern shown, the imaging means may be displaced from column to column and across all columns of the matrix. Where the scan line number minus the vertical offset is greater than 7 and less than 0 (row number) there is no output as the single pattern shown has the capability for reproducing up to 8 rows only. The scan sequence is completed by a predetermined number of image areas reproduced for the respective scan sequence and the number of image areas reproduced during any one scan sequence may vary between scan sequences as is shown in FIG. 2 and Table I. For example, during scan sequence 0 (the first scan sequence, only one image is reproduced in image area 0f of the pattern matrix. While during scan sequence 7, eight image areas are reproduced corresponding to pattern matrix position 5a, 3b, 6c, 2d, 0e, 7f, 4g, and 1h. A scan sequence can comprise reproduction of image areas within the pattern matrix positions of one column, or in a combination of columns but should never comprise the reproduction of image areas within a series of pattern matrix positions extending in a row long enough to form a discernable leading space such as would be produced by reproducing all of the image areas within pattern matrix positions 4a through 4h, immediately after leading. As in this case, the leading space, would extend continuously across the imaging surface corresponding to the pattern width.

Figure 3:
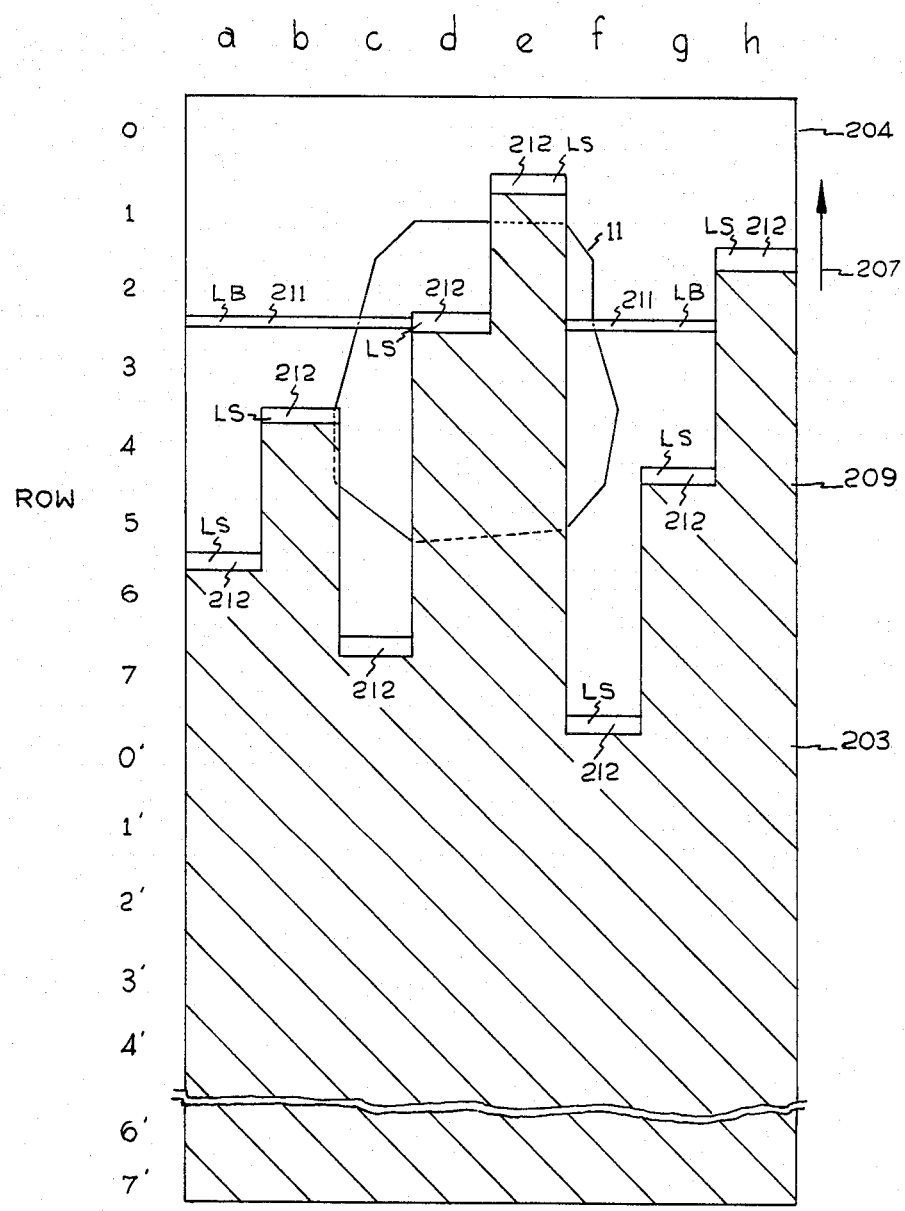
FIG. 3 shows the effect of reproducing image areas according to the pattern shown in FIG. 2 and the distribution of the leading space produced by movement of the image surface between several rows of the image and interspersed amongst the leading space separating a plurality of row pairs.

The application of the inventive principles and its effect produced are shown with respect to FIG. 3 which follows the matrix pattern of FIG. 2.

Assume the maximum deflection of the imaging beam extends through to row 7 with the first image in row 5 occurring in scan number 5. The spacial order of the sequential reproduction of the image areas on the image surface 203 is given by the scan number and the vertical offset for each matrix position. Information in the non-cross hatch area 204 on the image surface 203 is reproduced in scan numbers 0 to 7 and corresponds to pattern matrix positions 0a through 5a, locations 0b, through 3b, locations 0c through 6c, locations 0d through 2d, 0e, 0f through 7f, 0g through 4g and 0h through 1h.

In any system, the minimum increment of leading corresponding to deflection of the beam may be stated as LB and for the preferred embodiment is 4/27 pt. The minimum increment of leading for the imaging surface is stated as LS and for the preferred embodiment may be ¼ pt. The minimum image sheet leading for lines image areas such as halftone dot patterns then is the least common multiple of LB and LS and for the example shown in the preferred embodiment is 4 pt.

As shown with respect to FIG. 3, the image surface has first and second dimensions. The first dimension may be in the direction of the columns a through h, or may extend beyond column h dependent on the width of the imaging surface. A second dimension of the imaging sheet may extend in the direction of the rows 0 through 7, it being understood the image surface may extend in either direction beyond that shown in FIG. 3. Then as the imaging beam is successively deflected in the pattern of FIG. 3, the graphic image 11 of FIG. 1 is reproduced by a reproduction of a succession of reproduced separate image areas 0a to 7h in the corresponding matrix position.

As explained, the pattern for controlling the spacial relation of each sequentially reproduced image area is juxtaposed on the imaging surface electronically and may be moved by repeating the pattern in the direction of the first dimension (column direction) or the direction of the second dimension (row direction). In FIG. 3, the pattern effectively is moved by repeating it in the column direction, as shown by the juxtaposition of rows 0'-7' of the repeated pattern. The pattern may be repeated in a similar manner to the end of the image surface in the column direction and may be repeated in the row direction to the end of the image surface.

If the full deflection of the imaging beam is 8 rows (0-7) then for the 8th numbered scan, the image areas reproduced will be 6a, 4b, 7c, 3d, 1e, 5g, and 2h of the juxtaposed pattern. An image area corresponding to matrix position 0'f will also be reproduced during scan Number 8. However, as shown in the example, the full deflection of the imaging beam extends to row 7, the next row 0' being out of the deflection range of the beam.

Accordingly, the image surface 203 is leaded in the direction shown by arrow 207 to bring a new area of the image surface under the full deflection range of the imaging beam, it being understood that the deflection range of the imaging beam may, for example, extend over an image area corresponding to any number of juxtaposed patterns.

In FIG. 3 where the imaging surface is leaded between the 7th and 8th scan, (after the 7th and before the 8th), the reproduced image completed at the end of the 7th scan should be shown by the clear area 204. The image surface may then be moved in the direction of the arrow shown by 207 to bring an additional area of the imaging surface 203 within the range of the imaging beam. The pattern for controlling the sequence of the reproduced imaged areas on the imaging surface 203 then causes the imaging beam to move across the image surface and to reproduce the image areas corresponding to scan numbers 8 to 15.

The succession of images formed after movement of the imaging surface 203, and after scan number 7, is shown by the hatched area 209. The leading space 212 (LS) produced by movement of the image surface 203 is shown dispersed between lines 5 and 6 in column a, lines 4 and 3 in column b, lines 7 and 6 in column c, lines 3 and 2 in column d, lines 1 and 0 in column e, lines 7 and 0' of column f, lines 4 and 5 of column g and lines 2 and 1 in column h. The spacing 212 due to surface 203 leadimg may not be equal to the interline leading space (211) (LB) produced by deflection of the image beam from line to line. As can be seen, the next successive images are reproduced after image surface leading and during scan number 8 to 14. During those numbered scans all the remaining image areas juxtaposed with the pattern rows 0-7 will be reproduced and a portion of the image areas juxtaposed with the pattern row 0' to 7' will be reproduced.

Rows 0' to 7' are reproduced in the same way as rows 0 to 7 for the repeated juxtaposed pattern area and the image areas reproduced during scans 8 to 14 will be 6a, 7a, 4b to 7b, 7c, 3d to 7d, 1e to 7e, 5g to 7g, 2h to 7h and 0'a to 5'a, 0'b to 3'b, 0'c to 6'c, 0'd to 2'd, 0'e, 0'f to 7'f, 0'g to 4'g and 0'h to 1'h. As can be seen, the toothed reproduction pattern shown in FIG. 3 is moved down the image surface in the columnar direction, a line increment, after each leading step whether a beam LB or image surface LS leading step.

The LS spacing 212, shown as a result of the leading of the imaging surface is shown with a width wider than the interline spacing 211 (LB) resulting from a deflection of the imaging beam and with that difference accentuated. As can be seen, according to the principles of the invention, parts of sections of the leading space (LS) resulting from movement of the imaging surface are distributed between several line pairs of lines, (0-7) and is less easily detected by the eye due to its interspersement in the leading space 211 LB between lines 0-7 and its effective discontinuity. For example, where the total width of a imaging sheet may be over 500 columns of juxtaposed columns, then the distribution of the leading spacing 212 LS dispersed over those columns and along several lines will be visually undetected.

In the example shown in FIG. 3, the leading space 212 LS is shown interspersed in the leading space LB between line pairs 0-1, 1-2, 2-3, 3-4, 4-5, 5-6, 6-7, and 7-0'. The leading space 211 LB is shown only between line pair 2-3, the other leading spaces appearing between the reproduced images but not shown in FIG. 3.

The leading space 212 LS is shown contiguous with a respective leading space 211 LB and with both leading spaces parallel to the rows.

The leading space 212 LB appears between images reproduces immediately before and immediately successive to the leading step. Accordingly, each successive image area reproduced is displaced less than a full row and less than a number of image areas comprised by a full row, from an immediately preceeding image area.

It should be recognized that the imaging beam leading LB and the image surface leading LS can vary depending upon the system and application, and that the deflection range of the imaging beam as well as the line interval chosen for leading the imaging surface may be selected consistent with the particular system requirements.

What is shown is that an original may be analyzed into a pattern of successive images on respective lines of the original. The original images then may be reproduced in a random spacial sequence. Lines may be formed by displacing or leading an imaging beam. The imaging sheet may be displaced to bring a further successive portion of the imaging sheet under the deflection range of the imaging beam while distributing the spacing, between the images preceding and succeeding the leading of the image surface, over several different reproduced lines and with the image surface leading spacing LB being made discontinuous.

The pattern directing the scan sequence during reproduction may or may not require a scan be completed before image sheet leading and may lead the image sheet during a scan.

The pattern should be arranged so the actual leading space (LS) produced by leading the image sheet and extending in the direction of a second dimension is discontinuous, and with its continuous portions being sufficiently short and adjacent continuous portions sufficiently separated in the direction of the first dimension to be undetectable by the eye.

FIG. 4 shows a second embodiment for a pattern controlling the spacial sequence of image areas reproduced by an imaging beam. In this pattern, the imaging areas corresponding to the pattern row and column matrix positions are at an angle greater than 0 and specifically 45 degrees relative to each other. The pattern is larger than that shown in FIG. 2 and contains 16 rows and 16 columns. Because of the 45 degree angle orientation of each of the image areas, the odd rows overlap partially with the even rows.

However, the principles of imaging the image areas corresponding to the matrix row and column positions is the same as that with the 8×8 matrix shown in FIG. 2. For example, the vertical offset is established so that adjacent columns a through p contain sufficiently different values so that each successive image area is separated by a sufficient number of rows so that the leading space LS is discontinuous and separated in the direction of the first dimension across a succession of lines that its appearance is less visually perceptible. The use of the matrix shown in FIG. 4 is explained as follows:

As explained, a scan sequence is defined as the reproduction of a number of image areas corresponding to matrix row and column positions. The number of such image areas reproduced may vary from scan sequence to scan sequence, for example, in scan sequence 0, one image area is reproduced corresponding to matrix row and column position 0k. For scan sequence 15, eight image areas are reproduced corresponding to the pattern marix positions 15b, 3d, 9f, 11h, 5j, 1e, 13n, and 7p.

As explained with reference to the pattern of FIG. 2, the pattern may be repeated, effectively moving it on the image surface. The row location for any column location of the imaging beam is the same as for the matrix of FIG. 2, i.e., Scan number − Vertical Offset = Row number.

The vertical offset is that corresponding to the column location of the imaging beam.

A program for completing the reproduction of the image areas according to a pattern is shown in the attached program which is used with a Computer Automation Corporation, LSI 3/05 computer. The program is used with stored halftone or line graphic characters which are accessed accordingly for each respective matrix position corresponding to an image area on the imaging surface. Movement of the beam through each of the scan sequences is spacially controlled by the pattern, and as the beam is moved from image area to image area, the position of the beam is registered and the appropriate code is then used to access the correct picture element with a line graphic or halftone.

In the implementation of the inventive principles, any suitable reproducing means as is well known in the art may be used. Accordingly, any suitable general purpose computer may be programmed to reproduce the operation of the invention as described and as shown in the attached program may be also used.

Figure 5:
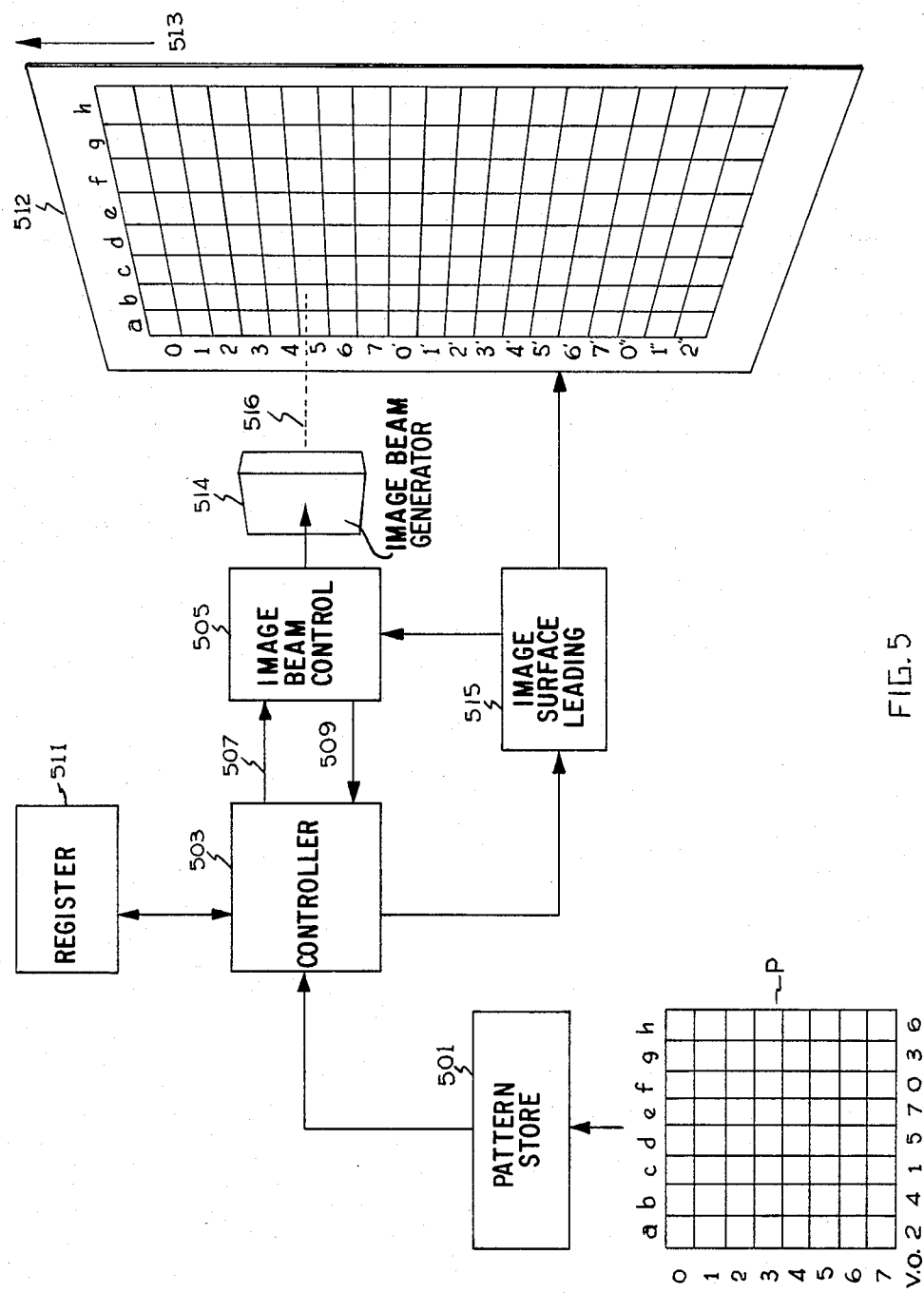
FIG. 5 shows an analogous system which may be used to carry out the principles of the invention.

FIG. 5 shows a functional diagram of an analogous system for carrying out the invention. This system is an anology of the software system used in the preferred embodiment and is shown for explanation purposes only. However, it should be understood systems similar to that shown in FIG. 5 could be used to carry out the principles of the invention. The system as shown for explanation contains a pattern store 501 which stores the pattern matrix P of row and column positions of image areas and controls the beam 516 produced by image beam means 514. A controller 503 receives the pattern from pattern store 501 and transmits beam command signals over line 507 to image beam control 505.

A register such as 511 is incremented each time a scan sequence is completed. The controller may cause the beam to be displaced to each successive image area responsive to the pattern P such as from position 2a to 0b to 3c to 4f to 1g during scan 4 or may, in a more rudimentary manner move the beam to each next successive column, derive the row location from the vertical offset of that next column and the scan number, and responsively move the beam to the derived row. In this case, a scan sequence is completed when the beam is displaced across all the columns of the pattern. The beam position is provided to the controller on line 509. Means may also be provided in the controller 503 for repeating the pattern as shown by rows 0'−7' and 0" and on. A means 515 is also provided for leading the image surface 514 in response to the controller 503, in the direction of arrow 513.

The inventive principles are implemented as shown by the attached program in the appendix for a Computer Automation LSI 3/05. However, as will be understood, the invention may be implemented in various ways without departing from the inventive principles.

APPENDIX ; COMPUTER PROGRAM

```
            06AD
            06AE
            06AF
2064                    *
2065                    * OUTPUT A LINE OF CHARACTERS WITH INTERLEAVING
2066                    *
2067    06B0 BEEB 071C  GSL80   CALL    GCSET
2068                    *
2069                    * FORWARD LEAD AT END OF LINE
2070                    * APPLY REAL LEADING AS FAR AS POSSIBLE, PRODUCE
2071                    * REMAINDER AS A BASE JUMP.
2072                    *
2073    06B1 82D1 0703          LDA     BLJLED   BLJ LEADING FOR THIS LINE
2074    06B2 86CE 0701          STA     BLJLO    BECOMES OLD BLJ LEADING
2075    06B3 0E25               SBM              TEST FOR END PICTURE AT
2076    06B4 8120 0020          LDAB    *PSTAD   START OF PATTERN
2077    06B5 0E27               SWM
2078    06B6 0E19               LRA     2
2079    06B7 36C2 06BA          JOR     $+3      JUMP IF NOT END PICTURE
2080    06B8 82D2 070B          LDA     =EPFLED  SET FWD. LEADING ROUTINE
2081    06B9 875D 0697          STA     FLPROG   FOR UN-RECORDED LEADING
2082    06BA 82C8 0703          LDA     BLJLED   ADD LEADING FOR THIS LINE
2083    06BB 8BD0 070C          ADD     BLJVAL   TO BASE LINE JUMP LEADING
2084    06BC 86C6 0703          STA     BLJLED   VALUE
2085    06BD 82C5 0703  GSL110  LDA     BLJLED
2086    06BE 8F55 0694          SUB     PBASE
2087    06BF 8FCD 070D          SUB     BLJD
2088    06C0 13C5 06C6          JAM     GSL120
2089    06C1 8B52 0694          ADD     PBASE
2090    06C2 86C0 0703          STA     BLJLED
2091    06C3 83CA 070E          LDA     LDVAL
2092    06C4 BFCA 070F          CALL    *FLPROG
2093    06C5 9E77 06BD          JMP     GSL110
2094                    *
2095                    * SEND LINE BUFFER FOR THIS LINE & HEAD UP NEXT BUFFER
2096                    *
2097    06C6 0901       GSL120  LAP     1        SEND BUFFER
2098    06C7 BFC8 0710          CALL    GLBEND
2099    06C8 9EAD 06F6          JMP     GSL180   ABORT EXIT
2100    06C9 BFC7 0711  GSL125  CALL    LBHEAD   SET UP NEXT
2101    06CA 9EAB 06F6          JMP     GSL180   ABORT EXIT
2102    06CB 9EA0 06EC          JMP     GSL140   EXIT FOR TIMESHARE
2103                    *
2104                    * TEST FOR END PICTURE AT END OF PATTERN & CLEAR LINE
2105                    * PRESENT FLAG FOR LAST LINE.
2106                    *
2107    06CC 0E25       GSL130  SBM
2108    06CD 8121 0021          LDAB    *PENAD   OBTAIN CONTROL BYTE FOR
2109    06CE 0E27               SWM              LAST LINE
2110    06CF 96C2 0712          AND     =:FE     CLEAR LINE PRESENT FLAG
2111    06D0 0E19               LRA     2        TEST FOR END PICTURE
2112    06D1 365E 06F0          JOS     GSL170   JUMP IF END PICTURE
2113    06D2 0E25               SBM
2114    06D3 8521 0021          STAB    *PENAD   RESTORE CONTROL BYTE
2115    06D4 0E27               SWM
2116                    *
2117                    * BUMP FIRST & LAST LINE CONTROL BYTE POINTERS
2118                    *
2119    06D5 8021 0021          LDA     PENAD    UPDATE LAST PATTERN
2120    06D6 8BBC 0713          ADD     GBUFFX   LINE CONTROL BYTE POINTER
2121    06D7 2000               TAX              WITH GBUFF WRAP AROUND
2122    06D8 8FBB 0714          SUB     GBMAX
2123    06D9 13C4 06DE          JAM     $+5
2124    06DA 83BA 0715          LDA     GBUFF
2125    06DB 8BB7 0713          ADD     GBUFFX
2126    06DC 04FF               SAI     1
```

```
2127  06DD  9E81 06DF           JMP     $+2
2128  06DE  0020                TXA
2129  06DF  8421 0021           STA     PENAD
2130  06E0  8020 0020           LDA     PSTAD      UPDATE FIRST PATTERN
2131  06E1  88B1 0713           ADD     GBUFFX     LINE CONTROL BYTE PTR
2132  06E2  2000                TAX
2133  06E3  8FB0 0714           SUB     GBMAX
2134  06E4  13C4 06E9           JAM     $+5
2135  06E5  83AF 0715           LDA     GBUFF
2136  06E6  8BAC 0713           ADD     GBUFFX
2137  06E7  0AFF                SAI     1
2138  06E8  9E81 06EA           JMP     $+2
2139  06E9  0020                TXA
2140  06EA  8420 0020           STA     PSTAD
2141  06EB  9FAA 0716           JMP     GSL40      DO NEXT LINE
2142                        *
2143                        *   TIMESHARE EXIT AFTER GLBEND
2144                        *
2145  06EC  DFAA 0717   GSL140  IMS     GSEND      EXIT TO CALL+3
2146  06ED  DFA9 0717           IMS     GSEND      FOR INPUT TO GBUFF
2147  06EE  8FA9 0718           CALL    GSENEX
2148  06EF  9E59 06C9           JMP     GSL125
2149                        *
2150                        *   END PICTURE
2151                        *
2152  06F0  8FA8 0719   GSL170  CALL    EPRLED     REVERSE LEAD AT
2153  06F1  0901                LAP     1          END PICTURE.
2154  06F2  BF9D 0710           CALL    GLBEND     SEND FINAL LINE BUFFER
2155  06F3  9E82 06F6           JMP     GSL180     ABORT EXIT
2156  06F4  83A5 071A           LDA     GABFLA     USER ABORT?
2157  06F5  1142 06F8           JAZ     GSL190
2158  06F6  0900        GSL180  LAP     0
2159  06F7  9E83 06FB           JMP     GSLEX      EXIT TO CALL+1
2160  06F8  DF9E 0717   GSL190  IMS     GSEND      EXIT TO CALL+4
2161  06F9  DF9D 0717           IMS     GSEND
2162  06FA  DF9C 0717           IMS     GSEND
2163  06FB  BF9C 0718   GSLEX   CALL    GSENEX
2164  06FC  9E7B 06F8           JMP     GSL190
2165                        *
2166                        *   REPORT LINE BUFFER OVERFLOW ERROR
2167                        *
2168  06FD  09F3        GSLER   LAP     GER3
2169  06FE  BF99 0718   GSLER1  CALL    GSENEX     ABORT EXIT
2170  06FF  9E7D 06FD           JMP     GSLER
2171                        *
2172  0700                EPFLA   RES     1        END PICTURE FLAG
2173  0701                BLJLO   RES     1        OLD BLJ LEADING
2174  0702                CHOFF   RES     1        CHARACTER OFFSET
2175  0703                BLJLED  RES     1        BLJ COMPONENT OF FWD. LEADING
2176  0704                PICWID  RES     1        PICTURE WIDTH IN S.C. LINES
2177  0705                PT1CNT  RES     1        PATTERN TABLE COUNTER
2178  0706                PT1PTR  RES     1        PATTERN TABLE POINTER
2179  0707                GXPOSN  RES     1        X POSN. AT PICTURE START
2180  0708                LCHCNT  RES     1        CURRENT LINE CHAR. COUNT
2181  0709                LOBPTO  RES     1        LOBUF OUTPUT POINTER
2182  070A                EPLEAD  RES     1        LEADING AT END PICTURE
2183        0011                  LPOOL
      070B  0A96
      070C  0F21
      070D  0F2C
      070E  0F2D
      070F  900F
      0710  08F7
      0711  08C1
      0712  00FE
      0713  0F16
      0714  0F15
      0715  0F14
      0716  0652
      0717  0636
      0718  0638
      0719  0AA1
      071A  0F2E
      071B
2184                        *
```

```
2185                     ********
2186                     * GCSET *
2187                     ********
2188                     *
2189                     * GRAPHIC CHARACTERS SET INTO LBUFF
2190                     * EXIT TO CALL+1 NO BLANK CHARACTER WHEN REQD.
2191                     *        CALL+2 OTHERWISE
2192                     *
2193                     * PTAB1 HAS PATX+N ENTRIES, WHERE N IS MAX INTERLEAVING
2194                     * PAT. OFFSET. ENTRIES ARE SET ACCORDING TO INTERLEAVIN
2195                     * PATTERN, AND ARE OF 2 WORDS EACH:
2196                     *      WORD 1 - BLJ TO BE APPLIED TO CHARACTER
2197                     *      WORD 2 - POSN. OF CHAR. IN GBUFF AT START OF LINE
2198                     *
2199                     * PTAB2 HAS PATX ENTRIES, SET ACCORDING TO PTAB1 ENTRIES
2200                     * AND INTERLEAVING OFFSET. EACH ENTRY CONSISTS OF 2 WORDS
2201                     *      WORD 1 - BLJ TO BE APPLIED TO CHARACTER
2202                     *      WORD 2 - CHAR. POSN. IN GBUFF RELATIVE TO LAST
2203                     *               CHAR. SET
2204                     *
2205  071C 0E0D    GCSET  ENT
2206                     *
2207                     * BUMP INTERLEAVING OFFSET
2208                     *
2209  071D 83BD 075B     LDA    INOFF
2210  071E 0B01          AAI    1
2211  071F 0C02          CAI    INOVAL+1
2212  0720 0900          LAP    0
2213  0721 87B9 075B     STA    INOFF
2214                     *
2215                     * SET PTAB2 ACCORDING TO PTAB1 ENTRIES
2216                     *
2217  0722 82B9 075C     LDA    =PTAB1   SET POINTER TO PTAB1 WITH
2218  0723 8BB7 075B     ADD    INOFF    INTERLEAVING OFFSET
2219  0724 8BB6 075B     ADD    INOFF
2220  0725 87B7 075D     STA    PTPTR
2221  0726 0908          LAP    PATX     SET COUNTER EQUAL TO
2222  0727 0001          NAR             INTERLEAVING PATTERN WIDTH
2223  0728 87B5 075E     STA    PTCTR
2224  0729 A2B5 075F     LDX    =PTAB2   PTAB2 POINTER IN X
2225  072A 83B5 0760 GCS10 LDA  *PTPTR   TRANSFER PTAB1 ENTRIES
2226  072B 8480 0000     STA    @0       TO PTAB2 FROM
2227  072C DFB0 075D     IMS    PTPTR    INTERLEAVING OFFSET
2228  072D 83B2 0760     LDA    *PTPTR
2229  072E 8481 0001     STA    @1
2230  072F DFAD 075D     IMS    PTPTR
2231  0730 2B02          AXI    2
2232  0731 DFAC 075E     IMS    PTCTR
2233  0732 9E77 072A     JMP    GCS10
2234                     *
2235                     * CONVERT ABSOLUTE CHAR. POSNS. IN PTAB2
2236                     * TO RELATIVE CHAR. POSNS.
2237                     *
2238  0733 0908          LAP    PATX     SET COUNTER TO PATX-1
2239  0734 0AFF          SAI    1        (ENTRY 1 DOES NOT HAVE
2240  0735 0001          NAR             TO BE CONVERTED HERE)
2241  0736 87A7 075E     STA    PTCTR
2242  0737 2AFD          SXI    3
2243  0738 8082 0002 GCS20 LDA  @2       CHAR. POSN. - POSN. OF
2244  0739 8C80 0000     SUB    @0       PREVIOUS CHAR. = RELATIVE CHAR.
2245  073A 8482 0002     STA    @2       POSN.
2246  073B 2AFE          SXI    2
2247  073C DFA1 075E     IMS    PTCTR
2248  073D 9E7A 0738     JMP    GCS20
2249  073E 2B02          AXI    2
2250  073F A79D 075D     STX    PTPTR    CONVERT ENTRY 1
2251  0740 839A 075B     LDA    INOFF    SET PTR. TO 1ST CHAR.
2252  0741 0E01          LLA    1        POSN. IN PTAB1 WITH
2253  0742 8A99 075C     ADD    =PTAB1   INTERLEAVING OFFSET
2254  0743 2000          TAX             SET PTR. TO LAST CHAR.
2255  0744 0B08          AAI    PATX     POSN. IN PTAB1 WITH
2256  0745 0B08          AAI    PATX     INTERLEAVING OFFSET
2257  0746 0AFF          SAI    1
2258  0747 8799 0761     STA    GCSTMP   1ST CHAR. POSN. - LAST CHAR.
2259  0748 8081 0001     LDA    @1       POSN. = 1ST CHAR. REL. POSN.
```

```
2260  0749 8424 0024          STA    GBCPT    SAVE 1ST CHAR. ABS. POSN.
2261  074A 0808               AAI    PATX
2262  074B 8F96 0762          SUB    *GCSTMP
2263  074C 8793 0760          STA    *PTPTR
2264  074D 8024 0024          LDA    GBCPT    ALLOW FOR OFFSET
2265  074E 8F8C 075B          SUB    INOFF    INTERLEAVING PATTERN
2266  074F 8424 0024          STA    GBCPT
2267                     *
2268                     * CALCULATE NUMBER OF INTERLEAVING PATTERN WIDTHS
2269                     * WHICH CAN BE FITTED ONTO A LINE
2270                     *
2271  0750 0908               LAP    PATX
2272  0751 8791 0763          STA    PXVAL
2273  0752 8235 0708          LDA    LCHCNT   DIVIDE LINE LENGTH IN
2274  0753 8F90 0764          CALL   DVDINT   CHARS. BY PATTERN WIDTH
2275  0754 081B               DATA   PXVAL
2276  0755 2021               NXR
2277  0756 A78E 0765          STX    PRPTCT   PATTERN REPEAT COUNT
2278  0757 878E 0766          STA    PREMCT   REMAINDER COUNT
2279  0758 31CF 0768          JXN    GCS25    TEST FOR 0 REPT. COUNT
2280  0759 A01E 001E          LDX    GLBPTR   DEAL WITH REMAINDER
2281  075A 9F8C 0767          JMP    GCS35    ONLY
2282       000D               LPOOL
      075B 0F32
      075C 07D8
      075D 0816
      075E 0817
      075F 07EA
      0760 8816
      0761 081A
      0762 881A
      0763 0818
      0764 1850
      0765 0818
      0766 0819
      0767 07FA
2283                     *
2284                     * OUTPUT CHARACTERS BY REPEATING PATTERN ACROSS LINE
2285                     * UNTIL PRPTCT EXHAUSTED.
2286                     *
2287                     * 1ST PATTERN CHARACTER
2288                     *
2289  0768 A01E 001E  GCS25  LDX    GLBPTR   SET LBUFF POINTER IN X
2290  0769 8375 075F  GCS30  LDA    BLJ1     BLJ FOR CHAR 1
2291  076A 8480 0000         STA    @0       SET INTO LBUFF
2292  076B 0E25               SBM
2293  076C 8124 0024          LDAB   *GBCPT   LOOKUP CHAR ID CODE
2294  076D 0E27               SWM             IN GBUFF
2295  076E 8AD8 07C7          ADD    =!100    CHAR. ADDRESS BIT
2296  076F 0E51               LLA    6        FORM CHAR. ADDRESS CODE
2297  0770 8481 0001          STA    @1       SET START ADDR. INTO LBUFF
2298  0771 8024 0024          LDA    GBCPT    FORM RELATIVE POSN
2299  0772 8AFA 07ED          ADD    CHPOS2   OF NEXT CHARACTER IN
2300  0773 8424 0024          STA    GBCPT    GBUFF
2301                     *
2302                     * 2ND PATTERN CHARACTER
2303                     *
2304  0774 82F7 07EC          LDA    BLJ2
2305  0775 8482 0002          STA    @2
2306  0776 0E25               SBM
2307  0777 8124 0024          LDAB   *GBCPT
2308  0778 0E27               SWM
2309  0779 8ACD 07C7          ADD    =!100
2310  077A 0E51               LLA    6
2311  077B 8483 0003          STA    @3
2312  077C 8024 0024          LDA    GBCPT
2313  077D 8AF1 07EF          ADD    CHPOS3
2314  077E 8424 0024          STA    GBCPT
2315                     *
2316                     * 3RD PATTERN CHARACTER
2317                     *
2318  077F 82EE 07EE          LDA    BLJ3
2319  0780 8484 0004          STA    @4
2320  0781 0E25               SBM
2321  0782 8124 0024          LDAB   *GBCPT
```

```
2322  0783 0E27              SWM
2323  0784 8AC2 07C7         ADD    =:100
2324  0785 0E51              LLA    6
2325  0786 8485 0005         STA    *5
2326  0787 8024 0024         LDA    GBCPT
2327  0788 8AE8 07F1         ADD    CHPOS4
2328  0789 8424 0024         STA    GBCPT
2329                   *
2330                   * 4TH PATTERN CHARACTER
2331                   *
2332  078A 82E5 07F0         LDA    BLJ4
2333  078B 8486 0006         STA    *6
2334  078C 0E25              SBM
2335  078D 8124 0024         LDAB   *GBCPT
2336  078E 0E27              SWM
2337  078F 8AB7 07C7         ADD    =:100
2338  0790 0E51              LLA    6
2339  0791 8487 0007         STA    *7
2340  0792 8024 0024         LDA    GBCPT
2341  0793 8ADF 07F3         ADD    CHPOS5
2342  0794 8424 0024         STA    GBCPT
2343                   *
2344                   * 5TH PATTERN CHARACTER
2345                   *
2346  0795 82DC 07F2         LDA    BLJ5
2347  0796 8488 0008         STA    *8
2348  0797 0E25              SBM
2349  0798 8124 0024         LDAB   *GBCPT
2350  0799 0E27              SWM
2351  079A 8AAC 07C7         ADD    =:100
2352  079B 0E51              LLA    6
2353  079C 8489 0009         STA    *9
2354  079D 8024 0024         LDA    GBCPT
2355  079E 8AD6 07F5         ADD    CHPOS6
2356  079F 8424 0024         STA    GBCPT
2357                   *
2358                   * 6TH PATTERN CHARACTER
2359                   *
2360  07A0 82D3 07F4         LDA    BLJ6
2361  07A1 848A 000A         STA    *10
2362  07A2 0E25              SBM
2363  07A3 8124 0024         LDAB   *GBCPT
2364  07A4 0E27              SWM
2365  07A5 8AA1 07C7         ADD    =:100
2366  07A6 0E51              LLA    6
2367  07A7 848B 000B         STA    *11
2368  07A8 8024 0024         LDA    GBCPT
2369  07A9 8ACD 07F7         ADD    CHPOS7
2370  07AA 8424 0024         STA    GBCPT
2371                   *
2372                   * 7TH PATTERN CHARACTER
2373                   *
2374  07AB 82CA 07F6         LDA    BLJ7
2375  07AC 848C 000C         STA    *12
2376  07AD 0E25              SBM
2377  07AE 8124 0024         LDAB   *GBCPT
2378  07AF 0E27              SWM
2379  07B0 8A96 07C7         ADD    =:100
2380  07B1 0E51              LLA    6
2381  07B2 848D 000D         STA    *13
2382  07B3 8024 0024         LDA    GBCPT
2383  07B4 8AC4 07F9         ADD    CHPOS8
2384  07B5 8424 0024         STA    GBCPT
2385                   *
2386                   * 8TH PATTERN CHARACTER
2387                   *
2388  07B6 82C1 07F8         LDA    BLJ8
2389  07B7 848E 000E         STA    *14
2390  07B8 0E25              SBM
2391  07B9 8124 0024         LDAB   *GBCPT
2392  07BA 0E27              SWM
2393  07BB 8A8B 07C7         ADD    =:100
2394  07BC 0E51              LLA    6
2395  07BD 848F 000F         STA    *15
2396  07BE 8024 0024         LDA    GBCPT
```

```
2397   07BF 8AAB 07EB              ADD    CHPOS1
2398   07C0 8424 0024              STA    GBCPT
2399   07C1 2B08                   AXI    PATX         MOVE LBUFF POINTER
2400   07C2 2B08                   AXI    PATX
2401   07C3 DED4 0818              IMS    PRPTCT       BUMP PATTERN REPT. COUNT
2402   07C4 9E24 0769              JMP    GCS30
2403   07C5 A41E 001E              STX    GLBPTR
2404   07C6 9EB3 07FA              JMP    GCS35
2405        0011                   LPOOL
       07C7 0100
       07C8
       07C9
       07CA
       07CB
       07CC
       07CD
       07CE
       07CF
       07D0
       07D1
       07D2
       07D3
       07D4
       07D5
       07D6
       07D7
2406                        *
2407                        * PATTERN TABLE 1
2408                        *
2409        07D8            PTAB1  EQU    $
2410   07D8                        RES    PATX+PATX+INOVAL+INOVAL
2411                        *
2412                        * PATTERN TABLE 2
2413                        *
2414        07EA            PTAB2  EQU    $
2415   07EA                 BLJ1   RES    1
2416   07EB                 CHPOS1 RES    1
2417   07EC                 BLJ2   RES    1
2418   07ED                 CHPOS2 RES    1
2419   07EE                 BLJ3   RES    1
2420   07EF                 CHPOS3 RES    1
2421   07F0                 BLJ4   RES    1
2422   07F1                 CHPOS4 RES    1
2423   07F2                 BLJ5   RES    1
2424   07F3                 CHPOS5 RES    1
2425   07F4                 BLJ6   RES    1
2426   07F5                 CHPOS6 RES    1
2427   07F6                 BLJ7   RES    1
2428   07F7                 CHPOS7 RES    1
2429   07F8                 BLJ8   RES    1
2430   07F9                 CHPOS8 RES    1
2431                        *
2432                        * SET REMAINDER CHARACTERS INTO LBUFF
2433                        *
2434   07FA 829E 0819       GCS35  LDA    PREMCT       EXIT IF NO REMAINDER
2435   07FB 1159 0815              JAZ    GCSETX       CHARS, TO OUTPUT
2436   07FC 0001                   NAR
2437   07FD 869B 0819              STA    PREMCT
2438   07FE 829D 081C              LDA    =PTAB2
2439   07FF 8696 0816              STA    PTPTR        POINTER TO PTAB2
2440   0800 8395 0816              LDA    *PTPTR       SET BLJ FOR CHAR 1
2441   0801 8480 0000              STA    *0
2442   0802 0E93 0816              IMS    PTPTR        BUMP PTAB2 PTR
2443   0803 9E86 080A              JMP    GCS50        DO NOT BUMP GBCPT
2444                        *
2445   0804 8391 0816       GCS40  LDA    *PTPTR       SET BLJ FOR NEXT CHAR
2446   0805 8480 0000              STA    *0
2447   0806 0E8F 0816              IMS    PTPTR
2448   0807 838E 0816              LDA    *PTPTR       SET POINTER TO NEXT
2449   0808 8824 0024              ADD    GBCPT        GBUFF CHAR. INTO GBCPT
2450   0809 8424 0024              STA    GBCPT
2451   080A 0E25            GCS50  SBM
2452   080B 8124 0024              LDAB   *GBCPT       LOOK UP CHAR. ID CODE
2453   080C 0E27                   SWM
2454   080D 8A39 07C7              ADD    =:100        SET ADDRESS BIT
```

```
2455   080E 0E51              LLA     6         FORM CHAR, ADDRESS CODE
2456   080F 8481 0001          STA     *1        SET CHAR DIG ADDR INTO LBUFF
2457   0810 2802               AXI     2         BUMP LBUFF PTR,
2458   0811 DE84 0816          IMS     PTPTR     BUMP PTAB2 PTR
2459   0812 DE86 0819          IMS     PREMCT    BUMP REM CHAR COUNT
2460   0813 9E70 0804          JMP     GCS40     ROUND AGAIN
2461   0814 A41E 001E          STX     GLBPTR    UPDATE LINE BUFFER PTR,
2462                           *
2463                           * EXIT
2464                           *
2465   0815 9F87 081D   GCSETX RTN     GCSET
2466                           *
2467   0816              PTPTR  RES     1         PATTERN TABLE POINTER
2468   0817              PTCTR  RES     1         PATTERN TABLE COUNTER
2469   0818              PRPTCT RES     1         PATTERN REPEAT COUNT
2470   0819              PREMCT RES     1         REMAINDER CHARACTERS
2471   081A              GCSTMP RES     1         TEMP PTR,
2472   081B              PXVAL  RES     1         PATTERN WIDTH HOLDER
```

I claim:

1. A method of interspersing a leading space of a first width produced between pairs of a series of images formed by deflection of an imaging beam, by a leading step in a first direction over a plurality of lines separated by a leading space of a second width produced by said leading step in said first direction, and wherein said lines are formed by image areas in a graphic image located on an imaging surface having at least first and second dimensions extending in said respective first and second directions and comprising the steps of:

a. deriving signals indicative of the information content of said image areas,
   b. reproducing said image areas, responsive to said signals, on said image surface at predetermined locations, to form a succession of said lines of said images in said second direction,
   c. and, wherein said step of reproducing includes the steps of spacing said reproduced image areas in separate leading steps, producing leading spaces of said second width in said first direction to form said succession of said lines extending in the said second direction, and the step of interspersing one said leading space of said first width, produced between the pairs of said images in said leading space of said second width between a plurality of said line of images.

2. The method of claim 1, wherein said step of interspersing, includes the step of interspersing said leading space of said first width substantially in line with respective adjoining leading spaces of said second width and contiguous with an adjoining leading space of said second width.

3. The method of claim 2, wherein said step of leading includes the steps of storing and leading according to said sequential pattern and includes the further step of reproducing at least a plurality of said image areas successively in the said second direction according to said pattern to form a line and displaced in the said first direction from a respective preceding reproduced image area.

4. The method of claim 3, where said step of reproducing includes the step of reproducing said image areas according to said pattern in rows and columns, each said row representing a line extending in said second direction and each said column extending in the said first direction, and wherein said step of interspersing includes the step of interspersing said leading space of said first width within a leading space of said second width separating said rows representing line pairs and with said leading space of said second width separating two adjoining image areas in respective rows and within the same column.

5. The method according to claim 4, where said step of storing a sequential pattern includes the step of storing a vertical offset value for said columns in said pattern, said step of reproducing includes the step of moving an imaging means across said imaging surface in said direction of said second dimension corresponding to a plurality of columns, in a series of scan sequences, and the step of leading includes the step of moving the imaging means from an imaging surface location corresponding to a first row location in said pattern to a second location on said imaging surface corresponding to a second location in said pattern and the step of combining the vertical offset value for the column of the said second location with the respective scan sequence number to determine the row for the said second location.

6. An apparatus for making the leading space between the image areas, forming lines in a graphic image on an image surface, said image surface having at least two dimensions including means for deriving signals indicative of the information content of a plurality of image areas, means responsive to said signals for reproducing said image areas in lines of said imaging surface, said reproducing means including an imaging means, means for displacing said imaging means relative to said imaging surface in the direction of a first dimension corresponding to a succession of said lines and in the direction of a second dimension corresponding to the direction of said lines, said means for displacing said imaging means, leading said reproduced images from line to line in a succession of respective separate leading steps, and means for distributing the leading space formed by said respective separate leading steps between a plurality of line pairs.

7. The apparatus according to claim 6, where said means for distributing includes means for storing a pattern, having matrix positions corresponding to designated image areas on said image surface and where said means for displacing, displaces said imaging means to a succession of said designated image areas on said image surface in response to said pattern.

8. The method of claim 4, where said step of storing a sequential pattern includes the step of storing a vertical offset value for said columns in said pattern, said step of reproducing includes the step of moving an imaging means across said imaging surface in said second direction corresponding to a plurality of columns, in a series of scan sequences, and the said step of leading includes the step of moving the imaging means from an imaging surface location corresponding to a first row location in said pattern to a second location on said imaging surface corresponding to a second location in said pattern and the step of combining the vertical offset value for the column of the said second location with the respective scan sequence number to determine the row for the said second location.

9. The apparatus according to claim 8, where said means for displacing said imaging means displaces said imaging means in the direction of said lines responsive to said pattern and across a succession of image areas corresponding to the columns of said pattern and where said pattern scan sequence number is defined by the reproduction of said image areas on said image surface corresponding to a predetermined columnar width of said pattern.

10. An apparatus for interspersing a leading space of a first width over the leading spaces of a second width between image areas forming lines in a graphic image on an imaging surface, said imaging surface having at least two dimensions in respective first and second directions, and comprising a. means for deriving signals indicative of the information content of a plurality of said image areas, b. imaging means responsive to said signals for reproducing said image areas in lines in said second direction on said imaging surface, c. means for spacing said imaging areas in a successive set of leading steps in said first direction and producing a leading space between said lines of a second width, d. said means for spacing including means for producing a leading space between said lines of a first width and means for interspersing the said leading space of said first width over the said leading spaces of said second width.

11. The apparatus according to claim 10, where said inhibiting means, inhibits an imaging means when said produced row number is greater than stored row number.

12. The apparatus according to claim 10, including means for stopping said reproducing means, said means for stopping including means for generating a stored row number corresponding to a final line of said haalftone images, and said means for completing, completing said image areas on said final line responsive to said stored row number generated by means for stopping.

* * * * *